(No Model.)

G. T. COPELAND.
CORN POPPER.

No. 312,612. Patented Feb. 24, 1885.

Witnesses:
R. A. Latcher
Marshall Latcher

Inventor,
George T. Copeland
By J. W. Latcher
his Attorney

UNITED STATES PATENT OFFICE.

GEORGE T. COPELAND, OF GLOVERSVILLE, NEW YORK.

CORN-POPPER.

SPECIFICATION forming part of Letters Patent No. 312,612, dated February 24, 1885.

Application filed February 27, 1884. (No model.)

*To all whom it may concern:*

Be it known that I, GEORGE T. COPELAND, a citizen of the United States, residing at Gloversville, in the county of Fulton and State of New York, have invented a new and useful Corn-Popper, of which the following is a specification.

My invention relates to improvements in corn-poppers in which revolving stirrers attached to a vertical shaft operate in conjunction with a roasting-kettle; and the objects of my improvements are, first, to provide a discharge-spout in the upper portion of the roasting-kettle; second, to form a hopper in the cover of the kettle for the reception of the fresh corn, this latter to work in conjunction with the discharge-spout, through which the popped corn is thrown out continuously through the agency of the revolving arms or stirrers. I attain these objects by the mechanism illustrated in the accompanying drawings, in which—

Figure 1:
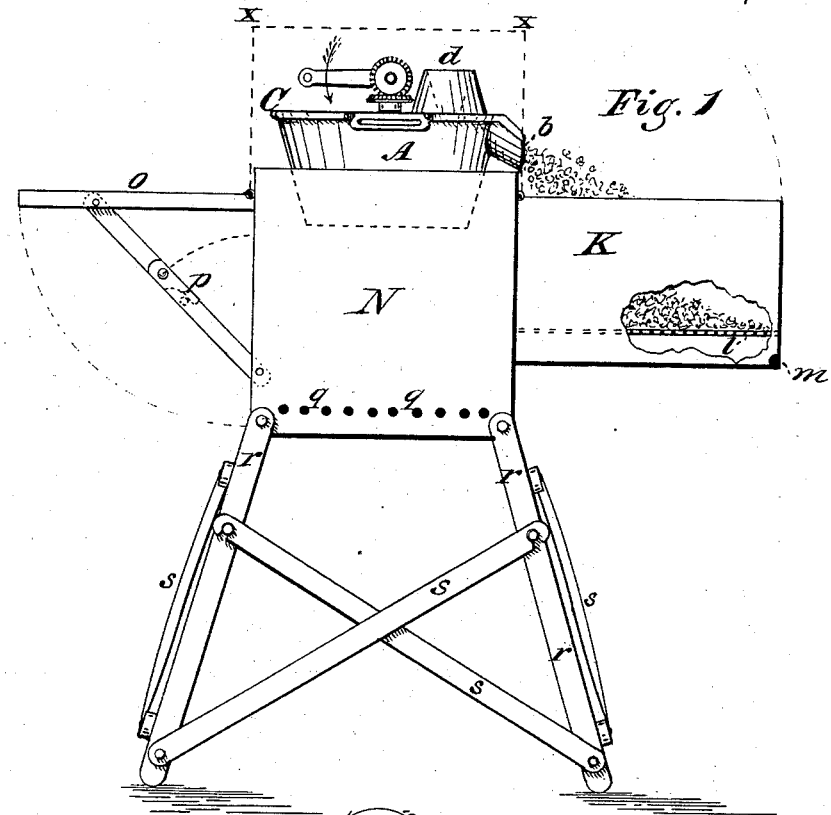
Figure 2:
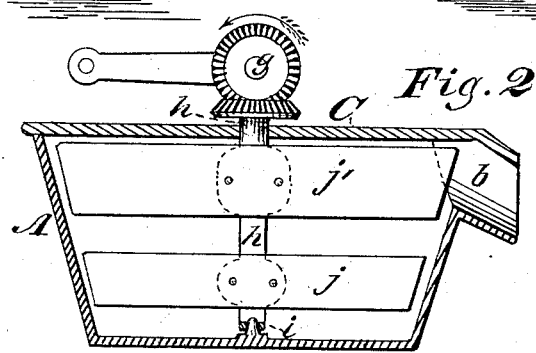
Figure 3:
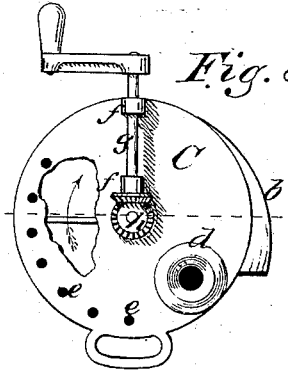

Figure 1 is a vertical elevation of the machine or apparatus. Fig. 2 is a vertical central section of the roasting-kettle and its appendages; and Fig. 3 is a top view of the roasting-kettle.

The arrows indicate the direction of motion of the different parts.

Similar letters refer to similar parts throughout the several views.

The roasting-kettle A is provided with an outlet-spout, $b$, a cover, C, provided with a hopper, $d$, and hot-air openings $e\ e$. Bearings $f\ f$ for the propelling-shafts $g\ h$ are also secured to the cover. The vertical shaft $h$ turns on a pivot at the center of the bottom $i$. Said shaft is provided with wings or arms $j\ j'$, which stir the corn in the operation of roasting or popping. A quantity of salt is placed in the kettle A, say, as high as the upper edge of the arms $j$, after which heat is applied to the kettle, and when sufficiently hot the corn is then poured continuously through the hopper $d$ into the kettle while the stirrers or arms $j\ j'$ revolve. Thus by centrifugal force and the reduced weight the popped corn, which obviously rises to the top, is continuously carried around to the delivery-spout $b$, into a receptacle, K, which is provided with a perforated bottom, $l$, which is somewhat elevated above the true bottom, as seen in Fig. 1.

The object of the perforated bottom $l$ is to screen the salt into the intervening space between it and the true bottom, after which the salt is poured out of the orifice $m$ and returned to the kettle. This last operation need only be performed after the required amount of corn has been passed through the apparatus, as it will be understood that the machine can be run an indefinite period, delivering a continuous stream of popped corn.

The kettle A may be heated on any ordinary stove, as will be readily inferred. I have, however, provided a portable apparatus embracing a heating appliance, making it complete in itself, and is constructed as follows:

N is a rectangular sheet-iron box having a circular opening in the top for the reception of the roasting-kettle A, a combined hinged door and shelf, $o$, supported by means of folding braces $p$, also the hinged cover and corn-receptacle K, which can be turned over to inclose the kettle A, as shown in rectangular dotted lines $x\ x$, Fig. 1. The box N contains an oil or gas stove, placed beneath the kettle A. $q\ q$ are air-holes to supply the flame with oxygen. Hinged posts or legs $r\ r$ are attached to and near the lower edges of the box N, and held in position by means of pivoted diagonal braces $s\ s$. One end of each of said braces is provided with a hook or a lateral notch, which may be engaged with headed pins or screws driven into the legs $r\ r$, permitting the legs $r\ r$ to be folded upward to embrace the cover K when turned over, as shown by dotted lines $x\ x$, providing by this operation handles for carrying the apparatus, besides occupying diminished space.

This machine may be turned or operated by hand, though to work on a large scale motive power may be used more economically. The spout $b$ is made of a scroll form, in order that the popped corn may be gradually carried away from the center of the kettle by means of the stirrers $j'$, as shown in Fig. 3.

What I claim as my invention, and desire to secure by Letters Patent, is—

1. In combination with the revolving stirrers $j\ j'$ and hopper $d$, the delivery-spout $b$, as set forth.

2. The combination of a roasting-kettle, A, stirrers $j\ j'$, hopper $d$, and spout $b$, the corn-receptacle K, with perforated bottom $l$ and salt-orifice $m$, substantially as set forth.

In testimony whereof I have signed my name in the presence of two subscribing witnesses.

GEORGE T. COPELAND.

Attest:
 JOHN BARD,
 FULTON BARD.